(12) United States Patent
Ito

(10) Patent No.: US 7,000,471 B2
(45) Date of Patent: Feb. 21, 2006

(54) ANGULAR VELOCITY SENSOR DEVICE

(75) Inventor: Hajime Ito, Ichinomiya (JP)

(73) Assignee: Denso Corporation, Kariya (JP)

( * ) Notice: Subject to any disclaimer, the term of this patent is extended or adjusted under 35 U.S.C. 154(b) by 110 days.

(21) Appl. No.: 10/809,452

(22) Filed: Mar. 26, 2004

(65) Prior Publication Data

US 2004/0187576 A1    Sep. 30, 2004

(30) Foreign Application Priority Data

Mar. 28, 2003    (JP)    ............... 2003-090970

(51) Int. Cl.
*G01P 9/04* (2006.01)

(52) U.S. Cl. ................................. 73/504.12
(58) Field of Classification Search ............ 73/504.12, 73/504.14
See application file for complete search history.

(56) References Cited

U.S. PATENT DOCUMENTS 6,490,924 B1    12/2002    Kato et al.
2001/0037682 A1    11/2001    Komaka et al.
2002/0073780 A1    6/2002    Katsumata et al.

FOREIGN PATENT DOCUMENTS

JP    A-2002-162228    6/2002
JP    A-2002-267450    9/2002

*Primary Examiner*—John E. Chapman
(74) *Attorney, Agent, or Firm*—Posz Law Group, PLC

(57) ABSTRACT

An angular velocity sensor device includes a switch (S1) for selecting a first or second driving signal mutually opposite in phase applied to driving electrodes (D1, D2) to oscillate a weight part (8) in a first direction. An adding circuit (29) adjusts the amplitude of the driving signal selected and adds it to a monitor signal reflecting the oscillating state of the weight part (8). A noise signal component appearing in the output signal of the adding circuit (29) is adjusted to a minimum and the output signal is supplied as a feedback signal to a self-oscillating circuit (27) for reducing the noise signal influence on the oscillating drive of the weight part.

2 Claims, 6 Drawing Sheets

ANGULAR VELOCITY SENSOR DEVICE

CROSS REFERENCE TO RELATED APPLICATION

This application is based upon, claims the benefit of priority of, and incorporates by reference the contents of Japanese Patent Application No. 2003-90970 filed on Mar. 28, 2003.

FIELD OF THE INVENTION

This invention relates to an angular velocity sensor device that effectively reduces noise signals from distorting sensor measurements.

BACKGROUND OF THE INVENTION

An electrostatically-driven static capacitance detection type angular velocity sensor conventionally includes a weight part (or oscillator) disposed on a semiconductor substrate. The weight part is formed on the semiconductor substrate and is able to oscillate in mutually perpendicular first and second directions. The angular velocity sensor also includes driving electrodes for receiving a driving signal to oscillate the weight part periodically in the first direction, monitor electrodes for monitoring static capacitance variations based on the oscillation of the weight part in the first direction, and detection electrodes for detecting static capacitance variations resulting from oscillation of the weight part in the second direction. The static capacitance variations are caused by a Coriolis force that arises when an angular velocity about an axis orthogonal to the first and second directions acts further to the oscillation in the first direction.

FIG. 6 shows a plan view of a prior art angular velocity sensor as disclosed in JP-A-2002-162228 (Patent Document 1) and JP-A-2002-267450 (Patent Document 2). FIG. 7 shows a sectional view of the sensor along line VII—VII in FIG. 6. This angular velocity sensor 1 is made by known semiconductor fabrication technology using a SOI (Silicon On Insulator) substrate 5 of a structure made by forming an oxide film 3 on the surface of a first silicon substrate 2 and affixing a second silicon substrate 4 to this oxide film 3. Different parts are formed by slits 9 formed in the second silicon substrate 4 constituting an upper face. A weight part 8 is disposed above an opening 10 formed by partially removing the oxide film 3 and the first silicon substrate 2 supporting the second silicon substrate 4.

The weight part 8 is supported on a base part 7 surrounding the weight part 8 by way of driving beams 14a to 14d capable of spring deformation in a first direction (hereinafter called the X direction) and detection beams 13a to 13d capable of spring deformation in a second direction (hereinafter called the Y direction). Comblike electrode parts discussed below are formed where the periphery of the weight part 8 and the base part 7 face each other.

That is, there are formed driving electrodes 15a, 15b for receiving driving signals, monitor electrodes 20a to 20d for monitoring driven oscillation of the weight part 8 in the X direction and detecting it as monitor signals, and detection electrodes 17a, 17b for detecting oscillation of the weight part 8 in the Y direction as detection signals occurring when an angular velocity ω acts about a Z axis orthogonal to the X and Y directions. Also, pads 23a, 23b, 19a, 19b and 22a to 22d for wire bonding are formed on the electrodes 15a, 15b, 17a, 17b and 20a to 20d respectively.

In this angular velocity sensor 1 shown in FIG. 6, when the driving electrodes 15a, 15b receive driving signals such as, for example sinusoidal waves, the weight part 8 responsively oscillates in the X direction on the driving beams 14a to 14d. At this time, the static capacitances between the monitor electrodes 20a to 20d and the weight part 8 vary. From this variation the amplitude and phase of the oscillation of the weight part 8 are detected. The driving signals are adjusted by a control circuit (not shown).

When, on top of the oscillation of the weight part 8 in the X direction, an angular velocity w acts about the Z axis, a Coriolis force arises in the weight part 8 in the Y direction, and the weight part 8 oscillates in the Y direction on the detection beams 13a to 13d. Variations arise in the static capacitances between the detection electrodes 17a, 17b and the weight part 8 as a result of the Y-direction oscillation. The value of the applied angular velocity ω is obtained by detecting the amounts of these variations.

Now, in an angular velocity sensor 1 of the kind shown in FIG. 6, the electrodes formed in the second silicon substrate 4 are supported on the oxide film 3 on the first silicon substrate 2 as shown in FIG. 8. FIG. 8 is a schematic sectional view illustrating how the electrodes are supported.

Consequently, as shown with a dashed line in FIG. 8, coupling arises between the driving electrodes 15a, 15b and the other electrodes because of a parasitic capacitance Cp10 formed between the driving electrodes 15a, 15b and the first silicon substrate 2 and a parasitic capacitance Cp20 formed between the monitor electrodes 20a to 20d and the first silicon substrate 2 and between the detection electrodes 17a, 17b and the first silicon substrate 2.

When this sort of coupling exists, noise signals caused by the driving signals are imposed on the monitor signals produced by the monitor electrodes 20a to 20d and the detection signals produced by the detection electrodes 17a, 17b. Because these noise signals are very large compared to the monitor signals and the detection signals, the problem arises that it is not possible to accurately detect the monitor signals and detection signals generated by the actual oscillation of the weight part 8.

As a method of reducing the influence of such noise of the driving signals, various methods have been proposed. As one of these, a method has been proposed in Patent Document 1 wherein, as shown in FIG. 6, dummy electrodes 34a–34d are formed in the second silicon substrate 4 between the driving electrodes 15a, 15b and in which are formed static capacitances the same as the parasitic capacitances formed between the driving electrodes 15a, 15b and the monitor electrodes 20a to 20d and the detection electrodes 17a, 17b. Noise signals from the driving signals entering the monitor signals and the detection signals is canceled out by signals from these dummy electrodes 34a to 34d.

Another method has been proposed in Patent Document 2 wherein, which is also shown in FIG. 6, in which opposite phase signal electrodes 35a to 35d for receiving signals opposite in phase to the driving signals are additionally formed in the second silicon substrate 4 in the proximity of the driving electrodes 15a, 15b. Noise signals entering the monitor signals and the detection signals are canceled out by signals from these opposite phase signal electrodes 35a to 35d.

A method has been proposed in JP-A-2002-188924 (Patent Document 3) wherein, to prevent noise caused by induction arising from interconnections close to the electrodes, electrical screening interconnections are added between the interconnections to the driving electrodes 15a, 15*b* and the interconnections to the monitor electrodes 20*a* to 20*d* and the detection electrodes 17*a*, 17*b*.

SUMMARY OF THE INVENTION

Although the methods described above do provide some reduction in the distortion resulting from the noise signals, they do not provided a complete solution. So, for increasing angular velocity detection accuracy, it is an object of the present invention to cancel out and thereby surely reduce noise signals entering the monitor electrodes, in particular. The reason for concentrating on the noise signals entering the monitor electrodes is because ensuring angular velocity detection accuracy requires the weight part to oscillate stably at its resonant frequency with a constant amplitude. Even if the noise signals affecting the detection electrodes are reduced, if the oscillation of the weight part is unstable due to the noise signals affecting the monitor signals, high detection accuracy cannot be obtained.

Further, when the amplitude of the noise signals is large compared to the true monitor signals, i.e. the signals generated by the oscillation of the weight part in the X direction, there is a fatal risk of self-resonance not occurring and the device therefore not functioning as an angular velocity sensor.

A sensor device according to a first aspect includes an angular velocity sensor affixed to an oxide film on a first semiconductor layer, a second semiconductor layer in which are formed a weight part for oscillating in a first direction (X direction) and a second direction (Y direction) perpendicular to this first direction, a pair of driving electrodes for applying driving voltages for oscillating the weight part in the first direction, a pair of monitor electrodes for monitoring the oscillation of the weight part in the first direction, and detection electrodes for detecting oscillation of the weight part in the second direction occurring when, on top of the oscillation in the first direction, an angular velocity acts about an axis (Z axis) orthogonal to the first and second directions. The sensor device also includes a self-oscillating circuit for generating first and second driving voltages mutually opposite in phase to be applied to the pair of driving electrodes, a pair of C/V-converting circuits for impressing a predetermined DC voltage on capacitors formed by the monitor electrodes and the weight part, for detecting currents that consequently flow and for generating voltages proportional to the static capacitances of the capacitors, and a differential amplifier circuit for obtaining the voltage difference between the output voltages of the C/V-converting circuits and supplying it to the self-oscillating circuit as a feedback voltage Vf.

The sensor device also includes a switch for selecting either the first or second driving signals and an adding circuit for adjusting the amplitude of the driving signal selected with the switch and adding it to the voltage difference outputted by the differential amplifier circuit. An output signal of the adding circuit is supplied to the self-oscillating circuit as a feedback signal.

When the toggle selection of the switch and the amplitude of the driving signal selected with the switch are adjusted by an adjustment method according to a second aspect of the invention set forth below, the influence of noise signals entering the monitor electrodes from the driving electrodes can be kept to a minimum and the weight part can be made to oscillate stably in the first direction.

A second aspect of the invention provides an adjustment method of an angular velocity sensor device for, in an angular velocity sensor device according to the first aspect of the invention, adjusting the selection of the first and second driving signals with the switch and the amplitude of the driving signal selected with the switch and inputted to the adding circuit. The method includes inputting the output signal of the adding circuit as a measurement signal and one of the first and second driving signals as a reference signal to a lock-in amplifier, applying an AC signal of a frequency away from the resonant frequency of the weight part to the driving electrodes by means of a signal generator substituted for the self-oscillating circuit, and, in this state, adjusting the selection of the first and second driving signals with the switch and the amplitude of the driving signal selected with the switch and inputted it to the adding circuit so that the absolute value of the DC output voltage of the lock-in amplifier is minimized, and thereafter removing the signal generator and the lock-in amplifier and supplying the output voltage of the adding circuit to the self-oscillating circuit as a feedback signal and commencing measurement of angular velocity.

If an angular velocity sensor device is adjusted by this adjustment method, the influence of noise signals entering the monitor electrodes from the driving electrodes can be kept to a minimum and the weight part can be made to oscillate stably in the first direction.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
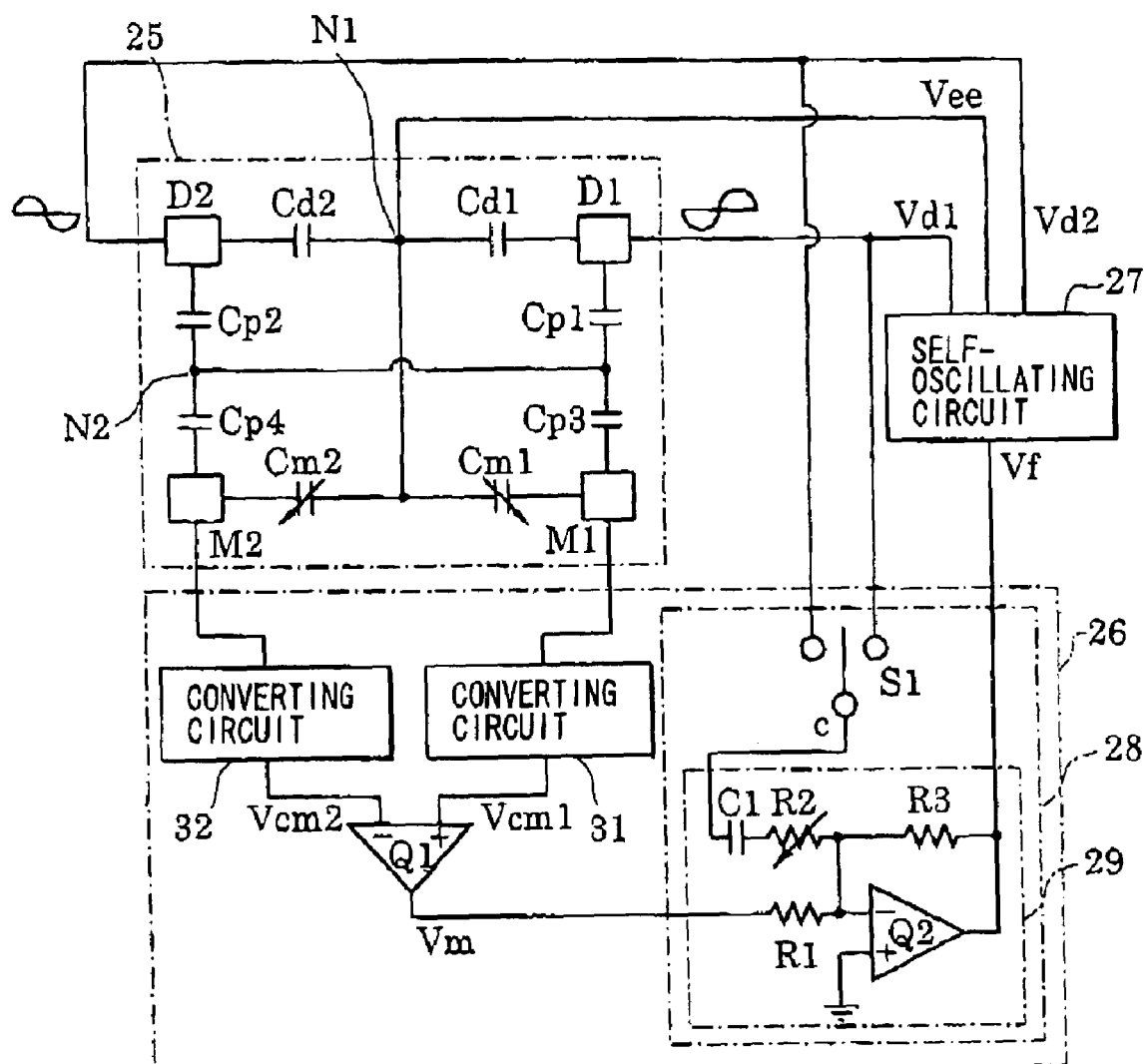
FIG. 1 is a circuit diagram of an angular velocity sensor device according to a preferred embodiment.
Figure 2:
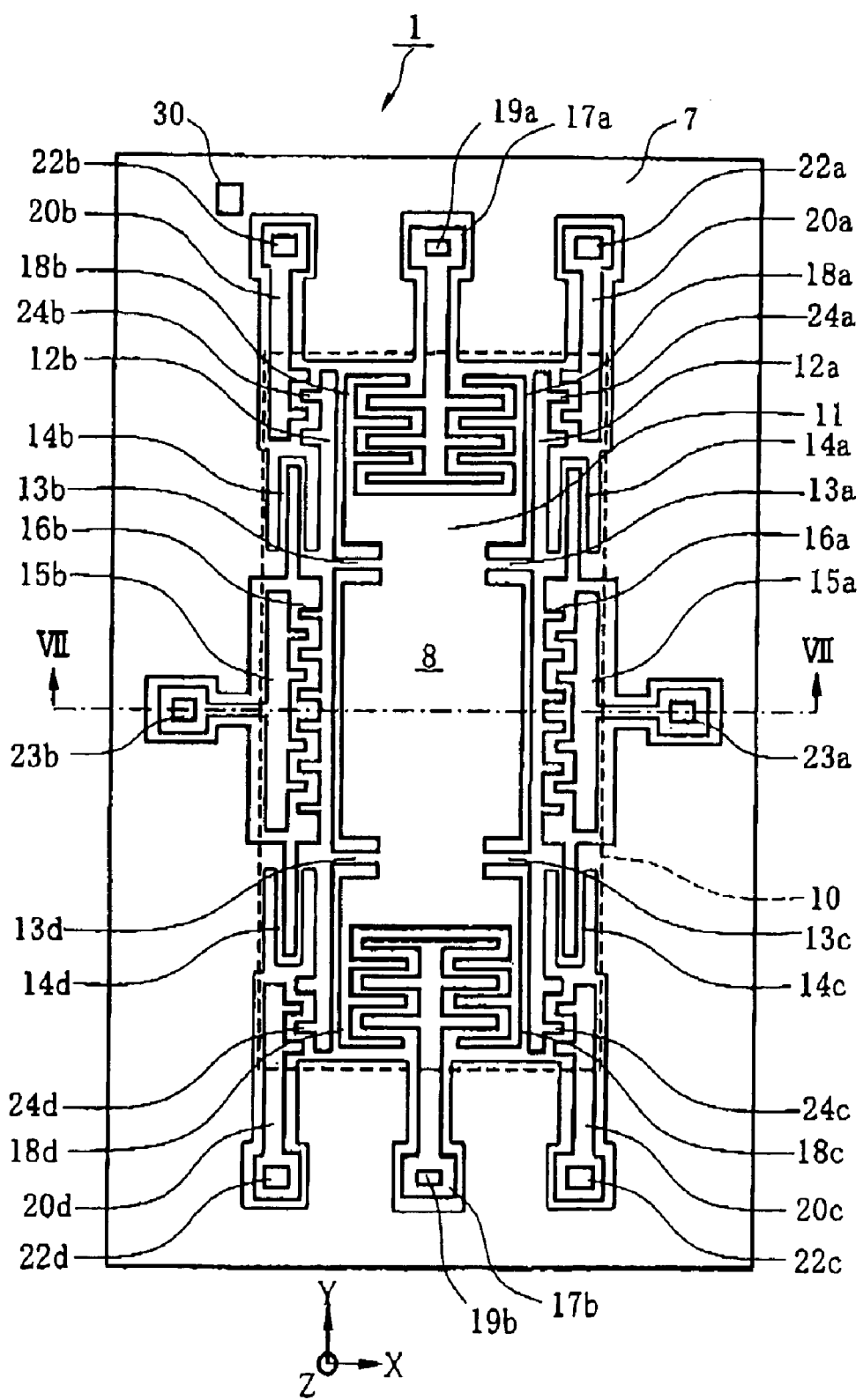
FIG. 2 is a plan view of an angular velocity sensor according to a preferred embodiment.

An electrostatically-driven static capacitance detection type angular velocity sensor device according to a preferred embodiment of the invention will now be described with reference to FIGS. 1–5 and 7. The angular velocity sensor device is comprised of an electrostatically-driven static capacitance detection type angular velocity sensor (angular velocity sensor) and control circuits such as a sensor driving circuit and a signal processing circuit. FIG. 2 is a plan view of one example of this angular velocity sensor, and FIG. 7 is a sectional view along line VII–VIX in FIG. 2.

Figure 7:
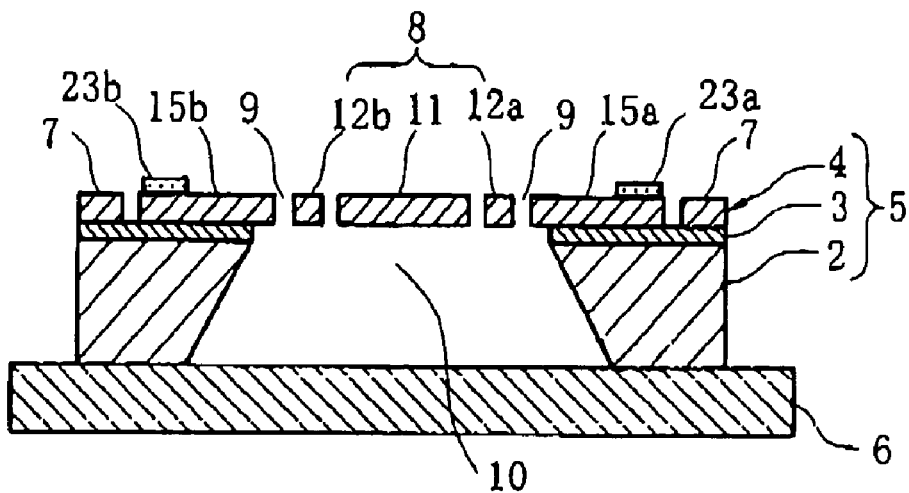
FIG. 7 is a sectional view along line VII—VII of FIG. 2 and FIG. 6.

Referring to FIG. 7, the angular velocity sensor 1 is formed using an SOI substrate 5 comprised of an oxide film 3 on the surface of a first silicon substrate 2 and a second silicon substrate 4 affixed to the oxide film 3. The SOI substrate 5 is fixed by means of an adhesive or the like to a circuit chip 6 on which control circuits such as a driving circuit and a signal processing circuit are formed.

The second silicon substrate 4 is sectioned into a peripheral framelike base part 7 and a movable weight part 8 positioned inside the base part 7 by slits 9 formed by etching. However, the two sections are not separate and are connected by beam parts as discussed later. Here, the oxide film 3 and the first silicon substrate 2 positioned below the inner weight part 8 are removed to form an opening 10. The outer base part 7 is supported by the oxide film 3 on the first silicon substrate 2 at the edge part of this opening 10.

The weight part 8 is sectioned into a substantially rectangular first moving part 11 positioned in the center of the second silicon substrate 4 and columnar second moving parts 12a, 12b provided on either side of the first moving part 11 in an X direction (first direction). Referring to FIG. 2, in the weight part 8, the first moving part 11 is connected to the second moving parts 12a, 12b by detection beams 13a to 13d, and the second moving parts 12a, 12b are connected to the base part 7 by driving beams 14a to 14d, each forming an approximate U shape.

Here, the driving beams 14a to 14d have freedom essentially only in the X direction, and on these driving beams 14a to 14d the entire weight part 8 can oscillate in the X direction. The detection beams 13a to 13d have freedom essentially only in a Y direction (second direction), and on these detection beams 13a to 13d the first moving part 11 of the weight part 8 can oscillate in the Y direction.

Comblike driving electrodes 15a, 15b supported on the edge part of the opening 10 are formed in the second silicon substrate 4 at the X-direction outer sides of the second moving parts 12a, 12b. The comblike driving electrodes 15a, 15b are disposed to face comb parts (driving comb parts) 16a and 16b projecting from the second moving parts 12a, 12b so that the respective combs mesh with each other. Driving signals for causing the entire weight part 8 to oscillate in the X direction, as will be further discussed later, are applied to the driving electrodes 15a, 15b. Pads (driving electrode pads) 23a, 23b for electrically connecting them by wire bonding or the like to the circuit chip 6 on which the control circuits are constructed are formed out of aluminum or the like on the driving electrodes 15a, 15b.

Comblike detection electrodes 17a, 17b supported on the edge part of the opening 10 are formed in the second silicon substrate 4 at the Y-direction ends of the first moving part 11. Projecting comb parts (detection comb parts) 18a to 18d are formed in parts of the first moving part 11 of the weight part 8 that face the detection electrodes 17a, 17b. The detection comb parts 18a to 18d are disposed to face and to mesh with the detection electrodes 17a, 17b.

When the detection electrodes 17a, 17b and the weight part 8 are driven to oscillate in the X-axis direction, an angular velocity $\omega$ is applied to the angular velocity sensor 1 about a Z axis orthogonal to the X axis and the Y axis, a Coriolis force acts on the first moving part 11 of the weight part 8 in the Y-axis direction, and a Y-direction oscillation arises in the weight part 8. The detection electrodes 17a, 17b are electrodes for detecting this Y-direction oscillation as variations in the static capacitances of capacitors formed by the detection electrodes 17a, 17b and the first moving part 11. Pads (detection electrode pads) 19a and 19b for electrically connecting them by wire bonding or the like to the circuit chip 6 on which the control circuits are constructed are formed in aluminum or the like on the detection electrodes 17a, 17b.

Comblike monitor electrodes 20a to 20d supported on the edge part of the opening 10 are formed in the second silicon substrate 4 at the X-direction outer sides of the second moving parts 12. The monitor electrodes 20a to 20d are disposed facing comb parts (monitor comb parts) 24a to 24d projecting from the second moving parts 12a, 12b so as to mesh with them.

These monitor electrodes 20a to 20d are electrodes for detecting oscillation of the weight part 8 in the X direction as variations in the static capacitances of capacitors formed by the monitor electrodes 20a to 20d and the second moving parts 12a, 12b. Pads (monitor electrode pads) 22a to 22d for electrically connecting them by wire bonding or the like to the circuit chip 6 on which the control circuits are constructed are formed out of aluminum or the like on the monitor electrodes 20a to 20d.

The driving electrodes 15a, 15b, the detection electrodes 17a, 17b, the monitor electrodes 20a to 20d and the weight part 8 described above are all separated by slits 9 and are electrically isolated from each other.

In this angular velocity sensor 1, a periodically varying driving voltage (a sinusoidal wave or rectangular wave AC voltage) is received at the driving electrodes 15a, 15b via the driving electrode pads 23a and 23b, and electrostatic forces are responsively produced between the driving comb parts 16a 16b and the driving electrodes 15a, 15b. Driving signals mutually opposite in phase are applied to the driving electrodes 15a, 15b. When the electrostatic forces arise, the driving beams 14a to 14d act as springs, and the entire weight part 8 oscillates in the X direction.

When the oscillation starts, the static capacitances between the monitor electrodes 20a to 20d and the monitor comb parts 24a–24d change, and by detecting this change it is possible to monitor the oscillation frequency, amplitude and phase of the weight part 8. A signal obtained by this monitoring is inputted as a feedback signal to a self-oscillating circuit 27, further discussed later, which generates the driving signals. By this means, the oscillation frequency of the self-oscillating circuit 27 is automatically regulated to the resonant frequency of the weight part 8, and stable oscillation of the weight part 8 is effected.

When an angular velocity $\omega$ about the Z axis is added to this oscillation of the weight part 8 in the X direction, a Y-direction Coriolis force proportional to the X-direction oscillation speed acts on the weight part 8, and the first moving part 11 of the weight part 8 oscillates in the Y direction with the detection beams 13a to 13d acting as springs. When the first moving part 11 oscillates in the Y direction, the static capacitances between the detection electrodes 17a to 17d and the detection comb parts 18a to 18d vary. Therefore, by these changes in static capacitance being detected with the detection circuit on the circuit chip 6, the size of the added angular velocity $\omega$ can be obtained.

Here, in this preferred embodiment, a novel monitor signal processing circuit and regulating method thereof of the kind described below are employed, and this circuit construction and regulating method will be described with reference to FIG. 1 and FIGS. 3–5. FIG. 1 shows the equivalent circuit of the angular velocity sensor device when the weight part 8 of the 1 is oscillated in the X direction.

The reference number 25 in FIG. 1 denotes an electrically equivalent circuit to the angular velocity sensor 1. In this electrically equivalent circuit 25 only parts relating to the oscillating drive of the weight part 8 in the X direction and the monitoring of that oscillation are shown, and parts relating to Y-direction oscillation detection have been omitted. The circuit parts other than the electrically equivalent circuit 25 in FIG. 1 are control circuitry of the angular velocity sensor 1 and are constructed on the circuit chip 6. However, a Y-direction oscillation detection circuit has been omitted. Only an X-direction oscillation monitor signal processing circuit 26 and the self-oscillating circuit 27 for generating the driving signals for oscillating the weight part 8 in the X direction are shown for ease of illustration.

First, the electrically equivalent circuit 25 of the angular velocity sensor 1 will be explained. A connection node D1 (hereinafter, driving electrode D1) in the electrically equivalent circuit 25 is equivalent to the driving electrode 15a described in FIG. 2 and a connection node D2 (hereinafter, driving electrode D2) is equivalent to the driving electrode 15b. A connection node M1 (hereinafter, monitor electrode M1) is equivalent to the monitor electrodes 20a, 20c connected in parallel and a connection node M2 (hereinafter, monitor electrode M2) is equivalent to the monitor electrodes 20b, 20d connected in parallel. These parallel connections are made on the circuit chip 6. A connection node N1 is equivalent to the weight part 8, and a connection node N2 is equivalent to the first silicon substrate 2.

As explained earlier, the driving electrodes 15a, 15b and the second moving parts 12a, 12b joined to the first moving part 11 of the weight part 8 by the detection beams 13a–13d are separated and electrically insulated by the slits 9. The comblike driving electrodes 15a, 15b are disposed facing comb parts (driving comb parts) 16a and 16b projecting from the second moving parts 12a, 12b so that the respective combs mesh with each other. Consequently, the driving electrodes 15a, 15b and the second moving parts 12a, 12b form capacitors having the air in the slits 9 as their dielectric.

The second moving parts 12a, 12b are electrically connected to the first moving part 11 of the weight part 8 by the detection beams 13a to 13d. They are also electrically connected to the framelike base part 7 by the driving beams 14a to 14d. Accordingly, capacitances also exist between the driving electrodes 15a, 15b and the weight part 8. The reference numerals Cd1, Cd2 in the electrically equivalent circuit 25 denote these capacitances. The capacitor Cd1 represents the capacitance between the driving electrode 15a and the weight part 8, and the capacitor Cd2 represents the capacitance between the driving electrode 15b and the weight part 8. As mentioned above, the connection node N1 represents the weight part 8.

Similarly, capacitances also exist between the monitor electrodes 20a to 20d and the weight part 8. The reference numeral Cm1 in the electrically equivalent circuit 25 represents the capacitance of the capacitors between the monitor electrodes 20a, 20c and the weight part 8 connected in parallel. Similarly, Cm2 represents the capacitance of the capacitors between the monitor electrodes 20b, 20d and the weight part 8 connected in parallel. When the weight part 8 oscillates in the X direction, the X-direction gaps of the slits 9 separating the two sides vary and the values of the static capacitances Cm1 and Cm2 vary. Therefore, by detecting this variation it is possible to ascertain the state of oscillation of the weight part 8 in the X direction.

Figure 8:
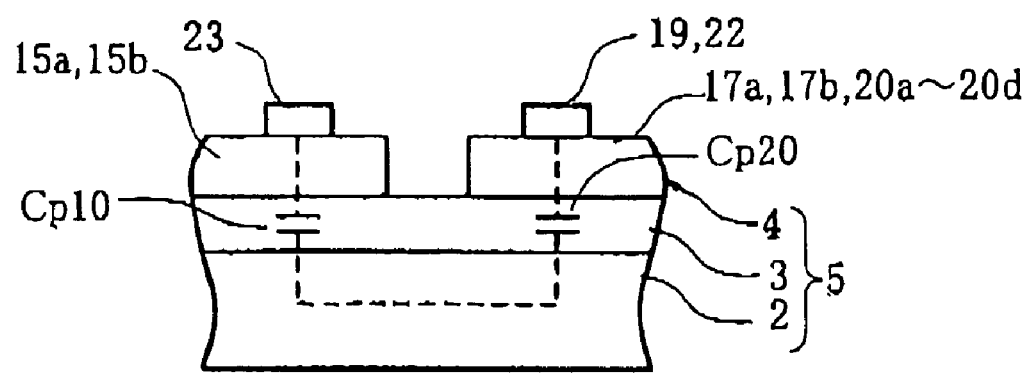
FIG. 8 is a schematic view illustrating capacitors constructed below electrodes.

And, as mentioned earlier, the angular velocity sensor 1 is made using a SOI substrate 5, and an oxide film 3 is sandwiched between the first silicon substrate 2 and the second silicon substrate 4 (see FIG. 7). The oxide film 3 is a dielectric, and the first and second silicon substrates 2 and 4 are conductors. Therefore, the first silicon substrate 2 and the electrodes made by working the second silicon substrate 4 form parallel plate capacitors having the oxide film 3 as their dielectric, as shown in FIG. 8.

The capacitors Cp1 to Cp4 shown in the electrically equivalent circuit 25 of the angular velocity sensor 1 of FIG. 1 represent these capacitors. That is, Cp1 represents the capacitor formed by the driving electrode D1 and the first silicon substrate 2, Cp2 the capacitor formed by the driving electrode D2 and the first silicon substrate 2, Cp3 the capacitor formed by the monitor electrode M1 and the first silicon substrate 2, and Cp4 the capacitor formed by the monitor electrode M2 and the first silicon substrate 2. The connection node N2 represents the first silicon substrate 2, and the first silicon substrate 2 is electrically isolated from the other parts.

Next, the driving circuit for driving the weight part 8 of the angular velocity sensor 1 in the X direction will be described. The driving signals are sinusoidal wave or rectangular wave AC voltages, and are generated in the self-oscillating circuit 27, which is a known circuit. Two output terminals of the self-oscillating circuit 27 are respectively connected to the driving electrodes D1 and D2. Here, the driving voltages received by the driving electrodes D1, D2 will be referred to as first driving voltage Vd1 and a second driving voltage Vd2 respectively. The potential of the connection node N1 corresponding to the weight part 8 will be referred to by Vee. To strengthen the driving forces generated by the driving signals and for C/V converting, which will be further discussed later, the value of Vee is maintained at a certain DC potential. The driving voltages Vd1, Vd2 are voltages of equal amplitude, with the potential to this connection node as the reference, but differing in phase by 180° (i.e. opposite in phase). Accordingly, AC voltages of opposite phase but equal amplitude are received at the capacitors Cd1 and Cd2.

When these opposite-phase AC voltages are received across the driving electrodes D1, D2, electrostatic forces arise between the driving electrodes 15a, 15b and the driving comb parts 16a, 16b, and the weight part 8 oscillates in the X direction on the driving beams 14a to 14d as springs.

When the weight part 8 oscillates in the X direction, the static capacitances of the capacitors Cm1, Cm2 between the monitor electrodes M1, M2 and the connection node N1 corresponding to the weight part 8 also vary. These variations in the capacitances Cm1, Cm2 are opposite in phase, i.e. staggered from each other by 180°.

The difference in the static capacitances of the capacitors Cm1 and Cm2 is converted to a voltage Vf by the monitor signal processing circuit 26, which will be described next, and fed back to the self-oscillating circuit 27. When the self-oscillating circuit 27 receives this feedback voltage Vf, it shifts its phase by 90° to generate the driving voltages Vd1, Vd2 as outputs. The generated voltages are received at the driving electrodes D1, D2 of the angular velocity sensor. The closed loop formed by the angular velocity sensor, the monitor signal processing circuit 26 and the self-oscillating circuit 27 amplifies only a resonant frequency component, and self-resonates at the resonant frequency.

The reason for oscillating the weight part 8 at its resonant frequency by using the self-oscillating circuit 27 to generate AC voltages to be applied to the driving electrodes D1, D2 is to oscillate the weight part 8 at a large amplitude with a small power. To detect an angular velocity by detecting oscillation in the Y direction, it is necessary for the amplitude of this X-direction oscillation to be constant. To ensure this, in the self-oscillating circuit 27, the amplitude of the feedback voltage Vf is kept constant by the amplitudes of the driving voltages being suitably controlled.

Next, the monitor signal processing circuit 26 will be described. The monitor signal processing circuit 26 is made up of two C/V (static capacitance/voltage) converting circuits 31, 32, a differential amplifier circuit Q1 and a noise correcting circuit 28.

Figure 3:
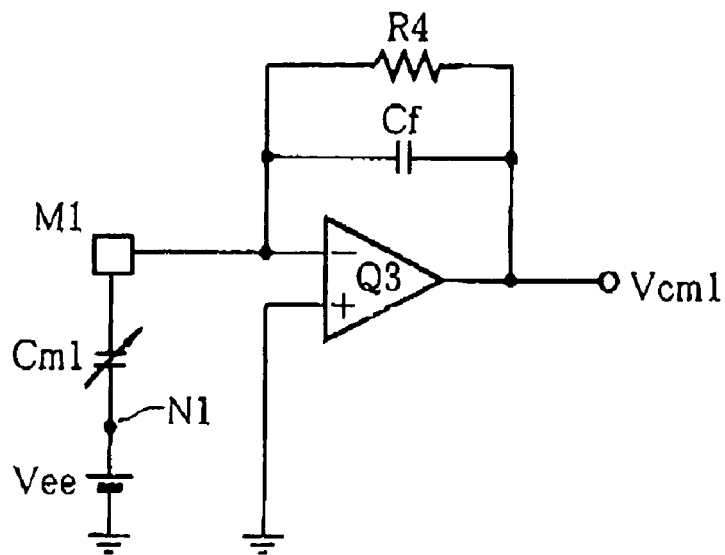
FIG. 3 is a circuit diagram of a C/V-converting circuit.

The C/V-converting circuits 31, 32 have input terminals respectively connected to the monitor electrodes M1, M2 and output voltages proportional to the values of the static capacitances Cm1, Cm2 between the monitor electrodes M1, M2 and the connection node N1, which corresponds to the weight part 8. Their circuit constructions may be, for example, as shown in FIG. 3. This circuit is a circuit example used as the C/V-converting circuit 31 of the electrically equivalent circuit 25.

The non-inverting input terminal of an operational amplifier Q3 is connected to the monitor electrode M1 of the electrically equivalent circuit 25. The capacitance Cm1 is connected between the non-inverting input terminal (the monitor electrode M1) and the connection node N1 (the weight part 8). The potential of the connection node N1 is the constant DC potential Vee mentioned above.

When the static capacitance of the capacitor Cm1 varies with time, the output voltage Vcm1 is as follows. Here it is assumed that the value of the resistance R4 is much larger than the impedance of the capacitor Cf.

$$Vcm1 = -(\Delta Cm1/Cf) \cdot Vee \qquad \text{Exp. (1)}$$

Because the values of Cf and Vee do not vary with time, the output voltage Vcm1 is proportional to the variation ΔCm1 of the capacitance Cm1, and its phase lags ΔCm1 by 180°.

When the weight part 8 resonates in the X direction, its displacement in the X direction lags the driving voltage Vd1 received at the driving electrode D1 by 90° in phase. Therefore, the value of the capacitance Cd1 also varies with a phase lag of 90° behind the driving voltage Vd1. The value of the capacitance Cm1 varies in-phase with the capacitance Cd1. Therefore, from the relationship of Exp. (1), the output voltage Vcm1 of the C/V-converting circuit 31 resulting from the variation in the capacitance Cm1 lags the driving voltage Vd1 by 270°. That is, it is 90° ahead of the driving voltage Vd1 in phase.

Similarly, the output voltage Vcm2 of the C/V-converting circuit 32 resulting from the variation in the capacitance Cm2 is 90° ahead of the driving voltage Vd2 in phase. The driving voltage Vd2 is 180° behind the driving voltage Vd1 in phase. Therefore, the output voltage Vcm2 of the C/V-converting circuit 32 resulting from the variation in the capacitance Cm2 is 90° behind the driving voltage Vd1 in phase, and is opposite in phase to the output voltage Vcm1 of the C/V-converting circuit 31.

Here, the output voltage Vcm1 of the C/V-converting circuit 31 is input to the non-inverting input terminal of the differential amplifier circuit Q1, and the output voltage Vcm2 of the C/V-converting circuit 32 is inputted to the inverting input terminal of the differential amplifier circuit Q1. Therefore, at the output terminal of the differential amplifier circuit Q1, a variation of an output voltage Vm resulting from the variation in the capacitance Cm1 and a variation in the output voltage Vm resulting from the variation in the capacitance Cm2 are in-phase and added to each other. The output voltage Vm constituting the result of this addition is ahead of the driving voltage Vd1 in phase by 90°.

From the above it can be seen that, if the existence of the capacitances Cp1 to Cp4 is not considered, the amplitude and frequency and phase state of the weight part 8 can be ascertained by means of the output voltage Vm of the differential amplifier circuit Q1.

Because the output voltage Vm of the differential amplifier circuit Q1 is proportional to the difference between the variations of the static capacitances of the capacitors Cm1 and Cm2, it seems that there would be no difficult y in generating the driving signals Vd1 and Vd2 by inputting this voltage directly to the self-oscillating circuit 27 and using it as the feedback voltage Vf for self-oscillation. However, because the values of the capacitances Cp1 to Cp4 are not zero, a problem arises that will be discussed below.

When the values of the capacitances Cp1 to Cp4 are not zero, the driving voltages Vd1, Vd2 received at the driving electrodes D1, D2 enter the monitor electrodes M1, M2 through these capacitances and noise signals are imposed on the output voltages Vcm1, Vcm2 of the C/V-converting circuits 31, 32.

Figure 4:
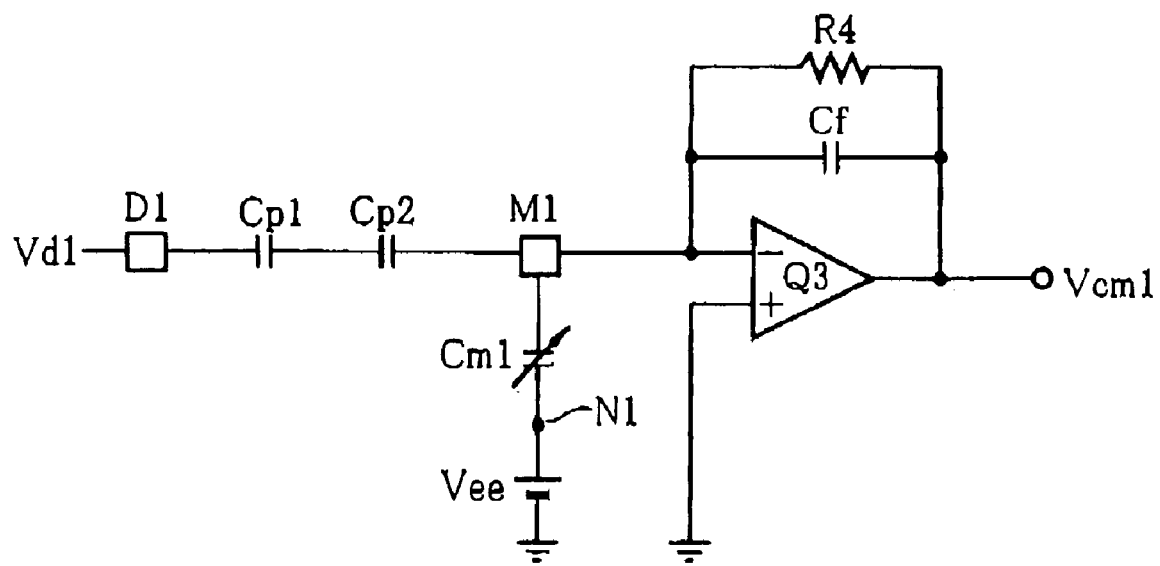
FIG. 4 is a circuit diagram of a C/V-converting circuit including the effects of noise signals.

For example, if the C/V-converting circuit 31 of FIG. 3 is redrawn to take account of noise into the monitor electrode M1, it becomes as shown in FIG. 4. From the driving electrode D1, under the impressed driving voltage Vd1, a noise current enters the monitor electrode M1 by a route passing through the capacitances Cp1, Cp2. In this case, the noise signal component in the output voltage Vcm1 originating in the driving voltage Vd1 received at the driving electrode D1 is 180° behind Vd1 in phase.

Similarly, a noise current enters the monitor electrode M2 under the driving voltage Vd2 impressed on the driving electrode D2. The noise signal component in the output voltage Vcm2 originating in the driving voltage Vd2 is 180° behind Vd2 in phase. Because the driving voltages Vd1 and Vd2 are apart in phase by 180°, the phases of the noise signal components included in the output voltages Vcm1, Vcm2 of the C/V-converting circuits 31, 32 are apart by 180°.

If the phases of the noise signal components included in the output voltages Vcm1, Vcm2 are 180° apart, because the output voltages Vcm1, Vcm2 undergo a subtraction in the differential amplifier circuit Q1, these two noise signal components appear in added-together form in the output voltage Vm of the differential amplifier circuit Q1. The phase of this noise signal component is 180° apart from the phase of the driving voltage Vd1 impressed on the driving electrode D1.

For such reasons, the output voltage Vm of the differential amplifier circuit Q1 in a real angular velocity sensor 1 is a voltage consisting of a true monitor signal originating in fluctuations of the static capacitances of the true monitor capacitors Cm1 and Cm2 plus a noise signal due to noise currents.

In this case, the voltage component appearing in the output voltage Vm of the differential amplifier circuit Q1 due to fluctuations of the static capacitances of the capacitors Cm1 and Cm2 (the true monitor signal component) appears ahead of the driving voltage Vd1 in phase by 90°. On the other hand, the voltage component (noise signal component) appearing in the output voltage Vm due to the noise signal components appears out of phase with the driving voltage Vd1 by 180°. This output voltage Vm consisting of a signal 90° ahead of the driving voltage Vd1 and a signal 180° out of phase with it has the same frequency as the driving voltage Vd1 but its phase difference with respect to the driving voltage Vd1 is not 90°.

When an output voltage Vm including a signal component whose phase does not match that of the true monitor signal component arising from the oscillation of the weight part 8 which is the driven object and the variations in the capacitances Cm1, Cm2 caused thereby, that is, out of phase with the true monitor signal component by 90°, is inputted to the self-oscillating circuit 27 as the feedback voltage Vf, it is difficult for the self-oscillating circuit 27 to oscillate the weight part 8 at its resonant frequency. As a result, because the oscillation frequency deviates from the resonant frequency of the weight part 8, the amplitude of oscillation of the weight part 8 becomes small, and the amplitude of the true monitor signal component becomes small. When this happens, the oscillation output voltage of the self-oscillating circuit 27 falls and the oscillation becomes unstable, and in a worst case the oscillation stops.

To solve this kind of problem, in this preferred embodiment, with the object of canceling and eliminating this noise signal component in the output voltage Vm of the differential amplifier circuit Q1, a noise correcting circuit 28 is newly added.

As shown in FIG. 1, the noise correcting circuit 28 is includes an inversion adding circuit 29 and a switch S1. The output voltage Vm of the differential amplifier circuit Q1 is applied to the inverting input terminal of an operational amplifier Q2 of the adding circuit 29 via a resistance R1. The non-inverting input terminal of the operational amplifier Q2 is grounded. A resistance R3 is connected between the output terminal and the inverting input terminal of the operational amplifier Q2, and a capacitor C1 and a variable resistance R2 are connected between the inverting input terminal and a common terminal C of the switch S1. The capacitor C1 is a device for blocking a DC component of a driving voltage, and its capacitance value is selected so that at the resonant frequency the impedance of the capacitor C1 is amply smaller than the resistance value of the variable resistance R2. The switch S1 is a switch for selecting either of two signals, and by this toggle selection either the driving voltage Vd1 or Vd2 is supplied to the variable resistance R2 via the common terminal C and the capacitor C1. The output voltage of the operational amplifier Q2 is supplied to the self-oscillating circuit 27 as the feedback voltage Vf.

As mentioned above, the noise signal component included in the output voltage Vm of the differential amplifier circuit Q1 is opposite to the driving voltage Vd1 in phase. Therefore, if the driving voltage Vd1 is received at the common terminal C of the switch S1, there is a possibility of the noise signal component being canceled in the adding circuit 29. However, depending on the polarity of the connections of the driving voltages Vd1, Vd2, which are the voltages of the self-oscillating circuit 27, to the driving electrodes D1, D2, and the way in which the C/V-converting circuits 31, 32 are connected to the differential amplifier circuit Q1, it is also possible that the noise signal component included in the output voltage Vm will be the in-phase with the driving voltage Vd1. It is for this reason that the switch S1 is provided to make it possible to select which voltage is impressed on the adding circuit 29 to cancel the noise signal.

Accordingly, one of the driving voltage Vd1 or Vd2 is selected by the switch S1, and the selected voltage is supplied to the variable resistance R2. Then, by adjusting the resistance value of the variable resistance R2, it is possible to cancel the noise signal included in the output voltage Vm of the differential amplifier circuit Q1.

The toggle selection of the switch S1 and the adjustment of the variable resistance R2 are carried out for example as follows. As explained earlier, the voltage component in the output voltage Vm of the differential amplifier circuit Q1 originating in the fluctuations of the capacitances Cm1, Cm2 is out of phase with the driving voltage Vd1 by 90°. This output voltage Vm is inverted by the operational amplifier Q2 and appears at the output terminal of the operational amplifier Q2 as the feedback voltage Vf. That is, the voltage component in the feedback voltage Vt originating in the fluctuations of the capacitances Cm1, Cm2 is out of phase with the driving voltages Vd1 and Vd2 by 90°.

Therefore, by for example tracing the waveforms of both the driving voltage Vd1 and the feedback voltage Vf constituting the output voltage of the adding circuit 29 on an oscilloscope and carrying out toggle selection of the switch S1 and adjustment of the variable resistance R2 so that the waveform of the feedback voltage Vf is shifted by 90° in phase from the driving voltage Vd1 and its amplitude is maximal, it is possible to cancel the noise signal. Also, instead of an oscilloscope, by using a two-phase lock-in amplifier with the driving voltage Vd1 as a reference signal and carrying out toggle selection of the switch S1 and adjustment of the variable resistance R2 so that the feedback voltage Vf is shifted by 90° in phase from the driving voltage Vd1 and its amplitude is maximal, the noise signal can be canceled out more accurately.

By providing a noise correcting circuit 28 made up of an adding circuit 29 and a switch S1 of the kind shown in FIG. 1 and performing the kind of adjustment described above like this, it is possible to cancel out the noise signal. And by supplying a feedback voltage Vf with the noise signal canceled in this manner to the self-oscillating circuit 27, the self-oscillation can be stabilized and as a result the weight part 8 can be made to oscillate stably at a frequency matched to its resonant frequency and with a constant amplitude.

Next, another method of adjusting the switch S1 and the variable resistance R2 in the noise correcting circuit 28 explained above will be described. When the amplitude of the noise signal is larger than the true monitor signal, i.e. the signal arising along with oscillation of the weight part in the X direction, because self-oscillation does not occur, it is not possible to carry out adjustment by the method described above. The method described below is an adjustment method with which it is possible to cancel out a noise signal accurately even when the amplitude of the noise signal is so great that self-oscillation does not occur.

Figure 5:
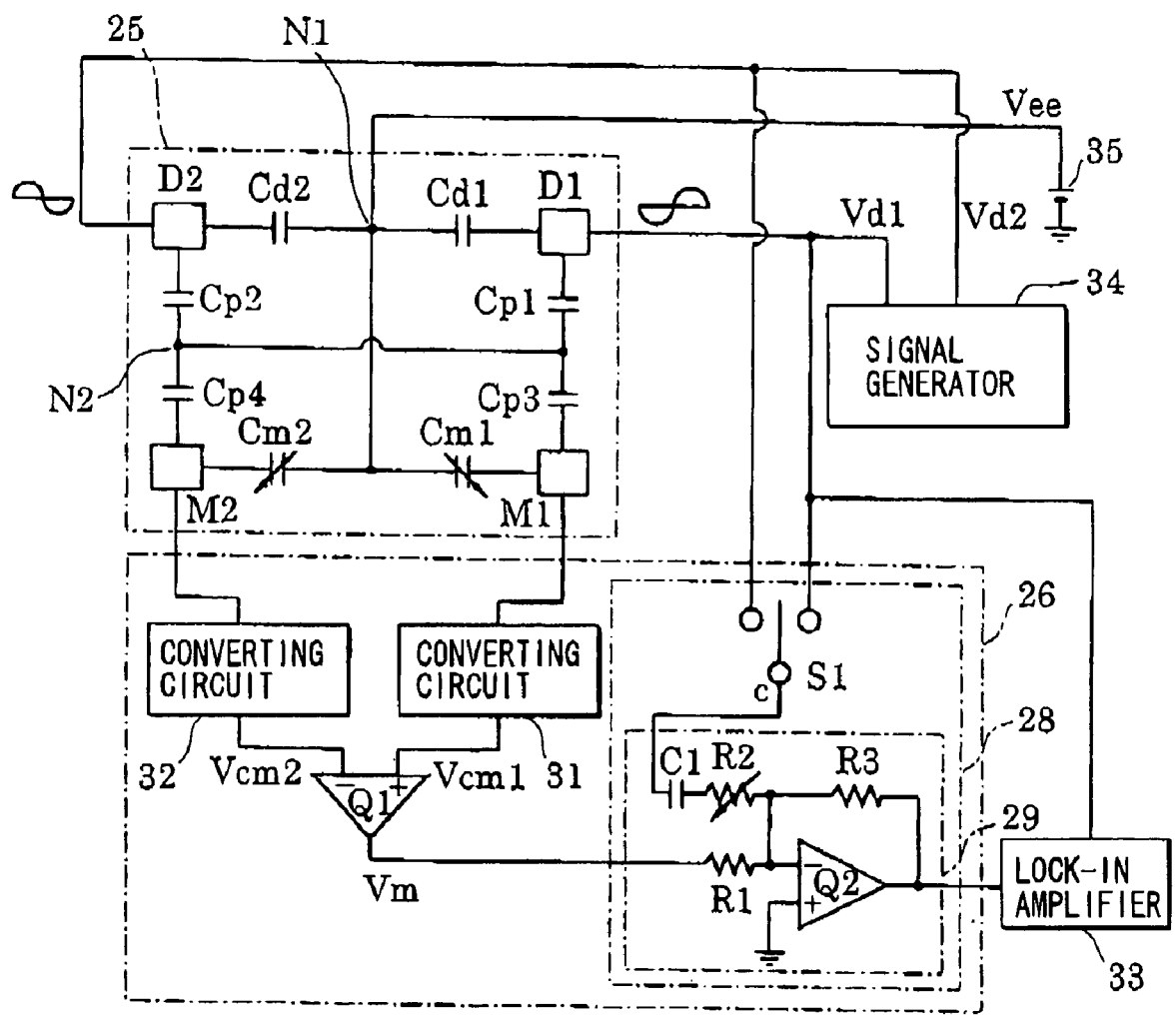
FIG. 5 is a circuit diagram of the angular velocity sensor device according to another embodiment in which adjustment is carried out using a signal generator.
Figure 6:
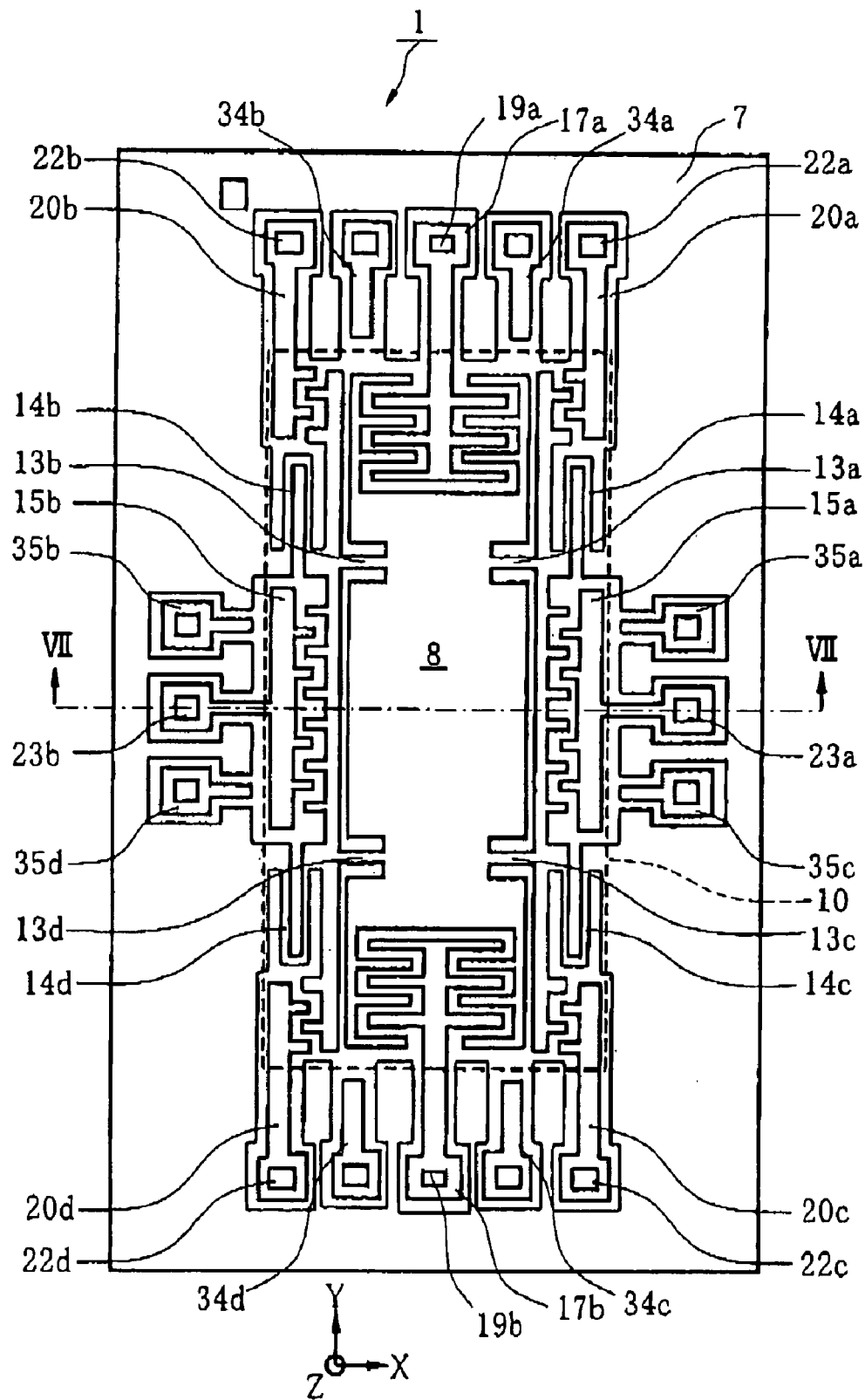
FIG. 6 is a plan view of a prior art angular velocity sensor.

This adjustment method will be described with reference to FIG. 5. FIG. 5 shows a circuit construction for when adjustment is carried out. Instead of the self-oscillating circuit 27, a signal generator 34 is connected to the driving electrodes D1, D2, and also a lock-in amplifier 33 is prepared and inputs the output voltage of the adding circuit 29 as a measurement signal. As a reference signal of the lock-in amplifier 33, the driving voltage Vd1 or Vd2 is inputted. In FIG. 5, the driving voltage Vd1 is inputted. Then, AC voltages Vd1 and Vd2 of the same amplitude but opposite in phase are generated from the signal generator 34. The frequency of the AC voltages is assumed to be away from the resonant frequency of the weight part 8. For example, if the resonant frequency is 5 kHz, it is set to 1 kHz.

When driving voltages Vd1, Vd2 of a frequency away from the resonant frequency of the weight part 8 are received at the driving electrodes D1, D2 in this manner, the amplitude of the weight part 8 is less than $\frac{1}{100}$ of its amplitude when resonating. Therefore, the fluctuations of the capacitances Cm1, Cm2 become small, and the true monitor signal level appearing in the output of the adding circuit 29 originating in the fluctuations of the capacitances Cm1, Cm2 becomes very small. Also, if the DC voltage Vee is made the same potential as the non-inverting input terminals of the operational amplifiers of the C/V-converting circuits 31, 32 (for example Q3 in FIG. 4), the true monitor signal level appearing in the output of the adding circuit 29 originating in the fluctuations of the capacitances Cm1, Cm2 becomes almost zero. On the other hand, since the values of the capacitances Cp1 to Cp4 constituting the cause of noise are fixed, noise occurs just as it does at the resonant frequency, and a large noise signal caused by them appears in the output of the adding circuit 29. That is, the output voltage of the adding circuit 29 consists almost entirely of noise signal component alone.

The lock-in amplifier 33 switches the measurement signal with a signal synchronized with the reference signal with a type of synchronous detector, and smooths this output with a low-pass filter. Accordingly, it converges components of the measurement signal in-phase or opposite in phase to the reference signal to a constant direct current value.

As explained earlier, of the output voltage of the adding circuit 29, the noise signal component is either in-phase or opposite in phase to the driving voltage Vd1 or Vd2. Therefore, by adjusting the switch S1 and the variable resistance R2 so that the absolute value of the output DC voltage of the lock-in amplifier 33 is minimized, it is possible to adjust the noise signal included in the output signal of the adding circuit 29 to a minimum.

After the switch S1 and the variable resistance R2 are adjusted like this, the output voltage of the adding circuit 29 is supplied to the self-oscillating circuit 27 as the feedback voltage Vf. If this is done, because the noise signal component included in the feedback voltage Vf has been minimized, the self-oscillating circuit 27 oscillates stably at the resonant frequency of the weight part 8.

Because self-oscillation is not effected at the time of the adjustment, even when the amplitude of the noise signal is so great that self-oscillation does not occur, with this method it is possible to adjust the noise signal to a minimum without fail.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An angular velocity sensor device comprising:

an angular velocity sensor including an oxide film affixed to a first semiconductor layer and a second semiconductor layer disposed above the first semiconductor layer, wherein the angular velocity sensor further includes a weight part formed within the second semiconductor layer that oscillates in a first direction and a second direction perpendicular to this first direction, a pair of driving electrodes for applying driving voltages for oscillating the weight part in the first direction, a pair of monitor electrodes for monitoring the oscillation of the weight part in the first direction, and detection electrodes for detecting oscillation of the weight part in the second direction occurring when, on top of the oscillation in the first direction, an angular velocity acts about an axis orthogonal to the first and second directions;

a self-oscillating circuit for generating first and second driving voltages mutually opposite in phase to be applied to the pair of driving electrodes;

a pair of C/V-converting circuits for impressing a predetermined DC voltage on capacitors formed by the monitor electrodes and the weight part and detecting currents that consequently flow and generating voltages proportional to a static capacitances of the capacitors;

a differential amplifier circuit for obtaining a voltage difference between the output voltages of the C/V-converting circuits and supplying the voltage difference to the self-oscillating circuit as a feedback voltage;

a switch for selecting the first or second driving signals; and an adding circuit for adjusting the amplitude of the driving signal selected with the switch and adding the driving signal selected to the voltage difference outputted by the differential amplifier circuit, wherein an output signal of the adding circuit is supplied to the self-oscillating circuit as a feedback signal.

2. An adjustment method for adjusting selection of the first and second driving signals with the switch and the amplitude of the driving signal selected with the switch and inputted to the adding circuit for the angular velocity sensor device of claim 1, the adjustment method comprising:

inputting the output signal of the adding circuit as a measurement signal and one of the first and second driving signals as a reference signal to a lock-in amplifier;

applying an AC signal of a frequency away from a resonant frequency of the weight part to the driving electrodes by a signal generator substituted for the self-oscillating circuit;

adjusting the selection of the first and second driving signals with the switch and the amplitude of the driving signal selected with the switch and inputting the driving signal to the adding circuit so that the absolute value of a DC output voltage of the lock-in amplifier is minimized; and removing the signal generator and the lock-in amplifier and supplying the output voltage of the adding circuit to the self-oscillating circuit as a feedback signal and commencing measurement of angular velocity.

* * * * *